US00RE47913E

(19) United States
(12) Reissued Patent
Ong et al.

(10) Patent Number: US RE47,913 E
(45) Date of Reissued Patent: Mar. 17, 2020

(54) IDLE MODE ACCESS THROUGH ASSISTED DISCOVERY

(71) Applicant: NOKIA TECHNOLOGIES OY, Espoo (FI)

(72) Inventors: Eng Hwee Ong, Espoo (FI); Janne Marin, Espoo (FI); Niko Kiukkonen, Veikkola (FI)

(73) Assignee: NOKIA TECHNOLOGIES OY, Espoo (FI)

(21) Appl. No.: 16/196,492

(22) Filed: Nov. 20, 2018

Related U.S. Patent Documents

Reissue of:
(64) Patent No.: 9,503,966
Issued: Nov. 22, 2016
Appl. No.: 13/188,878
Filed: Jul. 22, 2011

(51) Int. Cl.

| | |
|---|---|
| ***H04W 4/00*** | (2018.01) |
| ***H04W 48/10*** | (2009.01) |
| ***H04W 52/02*** | (2009.01) |
| ***H04W 88/10*** | (2009.01) |
| ***H04W 36/14*** | (2009.01) |
| ***H04W 84/04*** | (2009.01) |
| ***H04W 36/00*** | (2009.01) |
| ***H04W 48/18*** | (2009.01) |

(52) U.S. Cl.
CPC ..... *H04W 48/10* (2013.01); *H04W 52/0241* (2013.01); *H04W 36/0094* (2013.01); *H04W 36/14* (2013.01); *H04W 48/18* (2013.01); *H04W 84/045* (2013.01); *H04W 88/10* (2013.01); *Y02D 70/1262* (2018.01); *Y02D 70/142* (2018.01); *Y02D 70/24* (2018.01)

(58) Field of Classification Search
CPC . H04W 48/10; H04W 52/0241; H04W 36/14; H04W 36/0094; H04W 48/18; H04W 84/045; H04W 88/10; Y02D 70/24; Y02D 70/142; Y02D 70/1262
USPC ..... 455/435.1, 566, 552.1; 370/254
See application file for complete search history.

(56) References Cited

U.S. PATENT DOCUMENTS

| | | | | |
|---|---|---|---|---|
| 7,924,785 | B2 | 4/2011 | Shaheen et al. | |
| 2007/0211675 | A1* | 9/2007 | Jain | H04W 88/06 370/338 |
| 2008/0057956 | A1* | 3/2008 | Black | H04W 48/10 455/435.1 |
| 2008/0176568 | A1 | 7/2008 | Palanki et al. | |
| 2009/0239574 | A1* | 9/2009 | Hussain | 455/552.1 |

(Continued)

FOREIGN PATENT DOCUMENTS

| | | |
|---|---|---|
| EP | 2117279 A1 | 11/2009 |
| WO | 2011/019976 | 2/2011 |

OTHER PUBLICATIONS

Chinese Office Action dated Jul. 11, 2018 corresponding to Chinese Patent Application No. 201280036294.2.

(Continued)

*Primary Examiner* — Ovidio Escalante
(74) *Attorney, Agent, or Firm* — Squire Patton Boggs (US) LLP

(57) ABSTRACT

One embodiment is directed to a method of cell selection/reselection. The method includes gathering discovery information of a secondary radio access technology (RAT) by listening to a single primary radio access technology (RAT). The method may further include performing cell selection/reselection using the discovery information.

11 Claims, 9 Drawing Sheets

(56) References Cited

U.S. PATENT DOCUMENTS

| | | | | |
|---|---|---|---|---|
| 2009/0290555 | A1* | 11/2009 | Alpert | H04W 4/20 370/331 |
| 2010/0265847 | A1* | 10/2010 | Lee et al. | 370/254 |
| 2010/0296498 | A1 | 11/2010 | Karaoguz et al. | |
| 2011/0182202 | A1* | 7/2011 | Olofsson | H04J 11/0069 370/252 |
| 2011/0194530 | A1* | 8/2011 | Tinnakornsrisuphap et al. | 370/331 |
| 2013/0058233 | A1* | 3/2013 | Kim | 370/252 |

OTHER PUBLICATIONS

Chinese Office Action dated Oct. 27, 2016 con-esponding to Chinese Patent Application No. 201280036294.2.

Lim, C. et al. 'SHARE: seamless handover architecture for 3G-WLAN roaming environment'. Wireless Networks, Apr. 2009, vol. 15, issue 3, pp. 353-363; sections 4, 5.2; fig. 5; table 1.

Doppler, K. et al. 'On efficient discovery of next generation local area networks'. In: IEEE Wireless Communications and Networking Conference (WCNC). IEEE, 2011 (Mar. 28, 2011), p. 269-274. section II.

3GPP TS 36.311 V8.14.0 (Jun. 2011). '3rd Generation Partnership Project; Technical Specification Group Radio Access network; Evolved Universal Terrestrial Radio Access (E-UTRA) Radio Resource Control (RRC); Protocol specification (Release 8)'. 3GPP Standard (Jun. 24, 2011). p. 99-108.

International Search Report for corresponding International Application No. PCT/FI2012/050663, dated Oct. 3, 2012.

Written Opinion for corresponding International Application No. PCT/FI2012/050663, dated Oct. 3, 2012.

3GPP TS 36.211 V10.1.0 Technical Specification, 3rd Generation Partnership Project; Technical Specification Group Radio Access Network; Evolved Universal Terrestrial Radio Access; Physical Channels and Modulation (Release 10), Mar. 2011, pp. 1-103.

3GPP TS 36.331 V10.1.0 Technical Specification, 3rd Generation Partnership Project; Technical Specification Group Radio Access Network; Evolved Universal Terrestrial Radio Access; Radio Resource Control; Protocol Specificaiton (Release 10), Mar. 2011, p. 1-290.

3GPP TS 36.304 V10.1.0 Technical Specification, 3rd Generation Partnership Project; Technical Specification Group Radio Access Network, Evolved Universal Terrestrial Radio Access; User Equipment Procedures in Idle Mode (Release 10), Mar. 2011, pp. 1-33.

3GPP TS 36.213 V10.1.0 Technical Specification, 3rd Generation Partnership Project; Technical Specification Group Radio Access Network; Evolved Universal Terrestrial Radio Access; Physical Layer Procedures (Release 10), Mar. 2011, pp. 1-115.

IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications, IEEE Computer Society, IEEE Std 802.11, Jun. 12, 2007, pp. 1-1233.

Zhigang Cao, et al., "WLAN Discovery Scheme Delay Analysis and Its Enhancement for 3GPP WLAN Interworking Networks", vol. 90B, No. 6, IEICE Transactions on Communication, vol. E90-B (Jun. 2007), pp. 1523-1527.

European Search Report issued on Apr. 10, 2015, for corresponding European Patent Appln. No. 12818178.1.

European Patent Office, European Search Report for corresponding European Patent Application No. 12818178.1, dated Jul. 28, 2015.

* cited by examiner

IDLE MODE ACCESS THROUGH ASSISTED DISCOVERY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

Embodiments of the invention relate to a radio or wireless communications system.

BACKGROUND

In recent years, there has been explosive and increasing demand for mobile broadband delivery over cellular and wireless networks. As a result, the need for increasing broadband network capacity becomes imperative for network operators in order to maintain their annual capital expenditure (CAPEX) while continuing to offer the same flat rate data access and remain competitive. One of the key trends is the deployment of either 3GPP femtocell or wireless local area network (WLAN) for data offloading. A femtocell or Home NodeB (HNB) is a small cellular base station, typically designed for use in a home or small business. Apart from data offloading, femtocell allows network operators to extend service coverage indoors, especially where access would otherwise be limited or unavailable. In 3GPP terminology, a HNB is a 3G femtocell. A Home eNodeB (HeNB) is a Long Term Evolution (LTE) femtocell. In this disclosure, HNB will be used to refer to any type of femtocell.

Accordingly, data offloading with HNB or WLAN is a cost-effective solution to lower the cost of mobile broadband delivery, which is critical in sustaining the network operator's business model, as compared to a new macro cell where the cost of deploying a base station increases by several orders of magnitude. In other words, data offloading solutions would help to decrease the cost per bit while maintaining the same monthly bill for end-users.

SUMMARY

One embodiment is directed to a method including gathering discovery information of a secondary radio access technology (RAT) by listening to a single primary radio access technology (RAT) in idle mode, and performing cell selection/reselection using the discovery information.

Another embodiment is directed to an apparatus including at least one processor and at least one memory including computer program code. The at least one memory and the computer program code are configured, with the at least one processor, to cause the apparatus at least to gather discovery information of a secondary radio access technology (RAT) by listening to a single primary radio access technology (RAT) in idle mode, and perform cell selection/reselection using the discovery information.

Another embodiment includes a computer program embodied on a computer readable storage medium. The computer program is configured to control a processor to perform a process. The process includes gathering discovery information of a secondary radio access technology (RAT) by listening to a single primary radio access technology (RAT) in idle mode, and performing cell selection/reselection using the discovery information.

Another embodiment is directed to a method including storing wireless local area network (WLAN) discovery information in a long term evolution (LTE) system information block (SIB) and mapping the long term evolution (LTE) system information block (SIB) to a corresponding long term evolution (LTE) system information (SI) message, and broadcasting the wireless local area network (WLAN) discovery information, during a long term evolution (LTE) system information (SI) window, to at least one mobile device to be used for cell selection/reselection by the mobile device.

Another embodiment is directed to an apparatus including at least one processor and at least one memory including computer program code.

The at least one memory and the computer program code are configured, with the at least one processor, to cause the apparatus at least to store wireless local area network (WLAN) discovery information in a long term evolution (LTE) system information block (SIB) and map the long term evolution (LTE) system information block (SIB) to a corresponding long term evolution (LTE) system information (SI) message, and to broadcast the wireless local area network (WLAN) discovery information, during a long term evolution (LTE) system information (SI) window, to at least one mobile device to be used for cell selection/reselection by the mobile device.

Another embodiment is directed to a method including storing home nodeB (HNB) discovery information in a vendor specific information element, and broadcasting the home nodeB (HNB) discovery information to at least one mobile device to be used for cell selection/reselection by the mobile device.

Another embodiment is directed to an apparatus including at least one processor and at least one memory including computer program code. The at least one memory and the computer program code are configured, with the at least one processor, to cause the apparatus at least to store home nodeB (HNB) discovery information in a vendor specific information element, and broadcast the home nodeB (HNB) discovery information to at least one mobile device to be used for cell selection/reselection by the mobile device.

BRIEF DESCRIPTION OF THE DRAWINGS

For proper understanding of the invention, reference should be made to the accompanying drawings, wherein.

DETAILED DESCRIPTION

Figure 1:
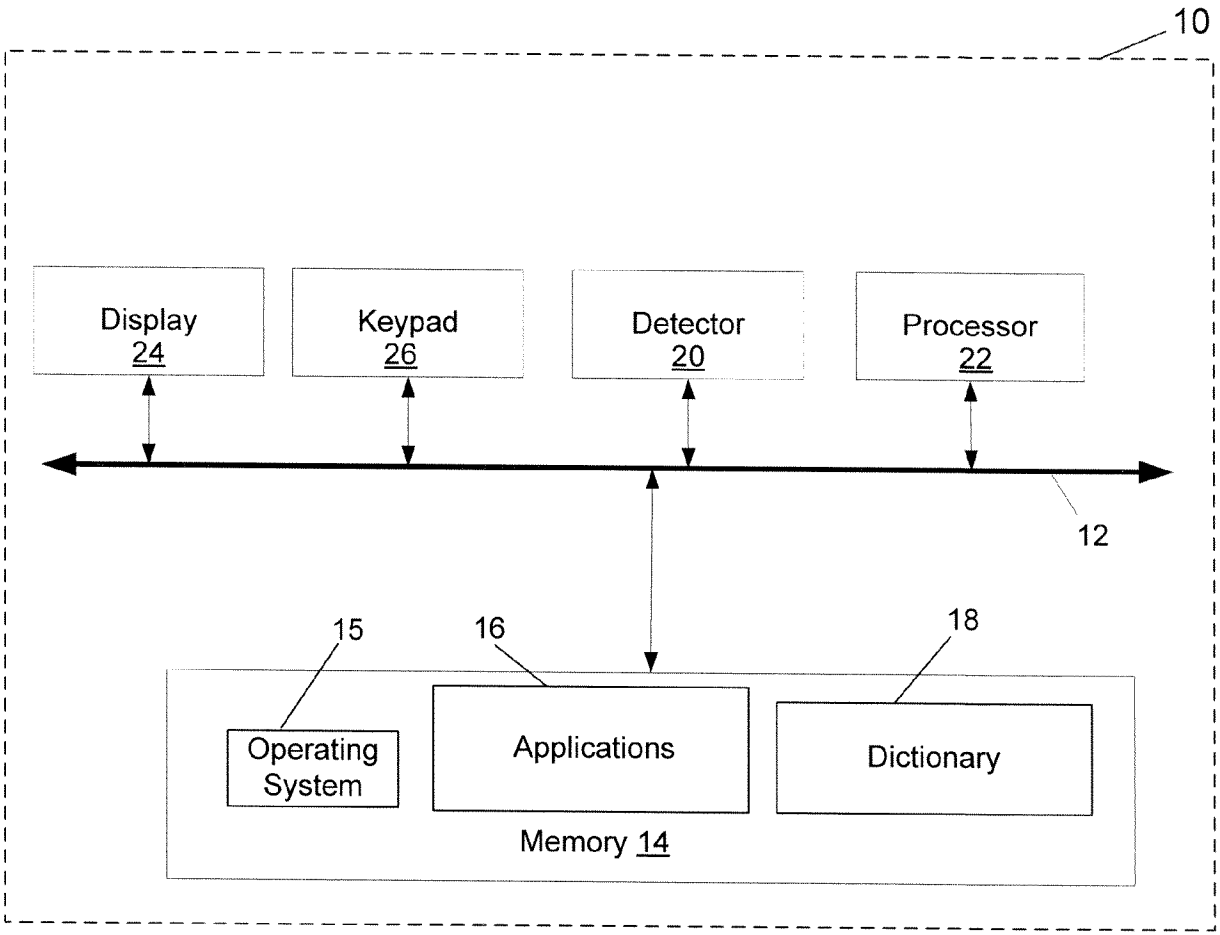
FIG. 1 illustrates an apparatus according to certain embodiments of the invention.

Although data offloading can be effectuated by HNB and WLAN, they are often considered as competitive solutions and, hence, exist independently. Considering the highly complementary characteristics of HNB and WLAN, the integration of these two technologies within a single access point would present many compelling optimization opportunities. As a result, it is expected that such a dual mode HNB/WLAN access point would be prevalent in the future as their cross-exploitation benefits become apparent to network operators, equipment vendors, and end-users. Certain embodiments of the invention aim to elicit the benefits of such a dual mode HNB/WLAN access point.

Additionally, with growing global concerns over carbon emission and carbon footprint reduction, 'green' communications have developed prime importance in the current wireless networking arenas that is expected to continue into the future. While there have been numerous initiatives to reduce the carbon footprint of mobile subscribers from different phases of the mobile communication lifecycle, such as supply chain, vendor, and end-of-life, little has been done in the usage phase. Some of the areas where the usage of today's mobile devices, such as smartphones, can be optimized include the following:

- Network discovery such as cell search procedure of 3GPP, e.g., LTE user equipment (UE) and scanning procedure of WLAN station (STA). These are one of the most energy consuming operations among others such as data transmission. Thus, it may be preferable that network discovery for individual radio access technology (RAT) is avoided whenever possible. Note that UE and STA are collectively known as devices hereinafter.
- LTE cell search procedure could be more efficient than WLAN passive/active scanning procedure when the number of channels to be scanned is limited by using stored information cell selection and measurement rules for cell reselection, for example. Hence, an intelligent scheme that switches between different network discovery procedures would enhance energy efficiency of devices.
- Powering on, at the same time, both LTE and WLAN interfaces in devices results in faster battery drain and, consequently, poor energy efficiency. Again, a context aware scheme that adaptively powers on/off interfaces would conserve significant energy.
- Access points typically operate in the power on state all the time. However, there are many instances, such as off-peak hours, night, and absence of end-users, where access points could be switched off to save energy.

Furthermore, successful HNB discovery during cell reselection is dependent on parameters such as intra-frequency threshold $S_{IntraSearch}$ for the case when macro cell and HNB share the same frequency, and inter-frequency threshold $S_{nonIntraSearch}$ for the case when macro cell and HNB use different frequencies. It should be noted that $S_{IntraSearch}$ and $S_{nonIntraSearch}$ reselection thresholds are incorporated in rules to limit the measurements the UE is required to perform in order to extend its battery lifetime. Further, in order to control access to HNB, it can be configured as open, closed, or hybrid access. Some embodiments of the invention consider HNB from the standpoint of closed access, also known as closed subscriber group (CSG) cell, which may be the typical access mode available in 3GPP Release 8. However, the concepts are easily modified for open access and similar for hybrid access available in 3GPP Release 9. Therefore, other embodiments may be directed to open, hybrid, or any other access scheme.

The optimal settings of the reselection thresholds may be non-trivial, particularly, for $S_{nonIntraSearch}$ due to high adjacent channel interference ratio (ACIR). These could then result in the inability to trigger cell reselection procedure which implies that data offloading via HNB becomes ineffective. Thus, quality of service (QoS) and energy efficiency of devices may also be degraded.

Although the current 3GPP Release 10 specifications (TS 25.304 and 36.304) introduce the concept of an autonomous search function for aiding cell reselection from macro cell to HNB, they do not specify when and/or where to search for allowed CSG cells. Furthermore, there have been discussions to define new HNB selection criterion and ranking offset to enable better cell reselection to HNB. However, these are typically frequency specific parameters which will affect all cells in that particular frequency. Hence, it is naturally challenging for such solutions to meet the requirements of both CSG and non-CSG cells. For example, prioritizing UE to camp on CSG cell will consume unnecessary energy to constantly search for CSG cells, even when they are not available. Moreover, these are still not available in the current 3GPP Release 10 specifications.

Based on the above, embodiments of the invention introduce a more energy efficient network access, which includes an enhanced cell selection/reselection procedure, as well as network and device operation schemes. Moreover, embodiments of the invention improve the probability of successful HNB discovery to ensure effective data offloading.

For example, embodiments of the invention facilitate energy efficient network access and operation schemes by leveraging the dual mode HNB/WLAN access point through assisted network discovery. In certain embodiments, energy efficiency during network access, as well as both network and device operation schemes in the idle mode are optimized. In addition, some embodiments provide a solution for guaranteed HNB discovery by leveraging the availability of dual mode HNB/WLAN access point.

Thus, one embodiment provides a method to reduce the time and, consequently, energy spent on network discovery, as well as network and device operation schemes based on usage patterns. Although some embodiments and examples discussed herein are based on the dual mode HNB/WLAN access point, other embodiments are readily applicable to a more general multi-RAT environment. In particular, embodiments of the invention enable devices to gather discovery information of secondary RATs by just listening to a single primary RAT during cell selection/reselection in the idle mode. In this way, devices will only need to scan the primary RAT once to acquire system information of the primary and any other secondary RATs. Unless otherwise stated, certain embodiments assume devices with multi-mode capability. It should be noted, however, that the same principles could also be applied for the case of inter-RAT handover during active mode.

Another embodiment of the invention introduces the second RAT, such as WLAN, to assist in HNB discovery for data offloading, for instance, when performing cell reselection from macro cell to HNB. The utilization of the WLAN interface will enable guaranteed HNB discovery, particularly, when the cell reselection procedure fails to be invoked either due to non-optimal $S_{IntraSearch}$ and $S_{nonIntraSearch}$ values or high ACIR when macro cell and HNB are deployed on different frequencies. It should be noted that cell reselection from macrocell to femtocell (HNB) is more challenging than from femtocell to macrocell and femtocell to femtocell. This is because physical cell identity (PCI) confusion may occur due to high PCI reuse which may be employed to circumvent the limited size of the neighbor cell list. PCI confusion occurs, for example, when the UE detects two neighboring cells of the same PCI values. As a result, the serving cell does not know which one the UE is measuring and reporting.

FIG. 1 illustrates an example of a device 10 configured to reduce the time and energy it spends on network discovery, according to one embodiment. In some embodiments, device 10 is implemented in an electronic device, such as a mobile device or user equipment, including a mobile telephone, smartphone, portable computer, tablet computer, laptop, notebook, Personal Digital Assistant (PDA), portable game console, or any other electronic device capable of communication with a network. In other embodiments discussed below, device 10 or portions thereof may be implemented in a base station or access point, such as a dual mode HNB/WLAN access point.

Device 10 may include an interface 12, such as a bus or other communications mechanism, for communicating information between components of device 10. Alternatively, the components of device 10 may communicate directly with each other, without use of interface 12.

Device 10 also includes a processor 22, coupled to interface 12, for receiving, managing, and/or processing network and user input or information, and for executing instructions or operations. Processor 22 may be any type of general or specific purpose processor.

Device 10 further includes a memory 14 for storing information and instructions to be executed by processor 22. Memory 14 can be comprised of any combination of random access memory (RAM), read only memory (ROM), static storage such as a magnetic or optical disk, or any other type of machine or computer readable media. Computer readable media may be any available media that can be accessed by processor 22 and could include volatile or nonvolatile media, removable or non-removable media, and communication media. Communication media may include computer program code or instructions, data structures, program modules or other data, and includes any information delivery media.

Processor 22 can further be coupled, via interface 12 or directly, to a graphical user interface or display 24, such as a thin film transistor (TFT) liquid crystal display (LCD), for displaying information to a user. In some embodiments, display 24 can be a touchscreen display that allows a user to interact directly with what is presented on display 24 by using their finger, hand, stylus, or another passive object. A keypad 26 can further be coupled to interface 12 to enable a user to interface with device 10. In one example, keypad 26 is a touchscreen keypad displayed on display 24 where each of the keys can be activated by touching that portion of display 24. Alternatively, keypad 26 may be a physical keypad.

Device 10 can further include a sensor or detector 20 for detecting some action taken, for example, by a user by means of display 24 or keypad 26. Detector 20 can be a separate component of device 10 or, alternatively, detector 20 can be included as a function of processor 22.

In one embodiment, memory 14 stores software modules or applications that provide functionality when executed by processor 22. The modules may include an operating system 15 that provides operating system functionality for device 10. The memory 14 may also store applications 16, such as text editing or messaging applications, games, web browsers, etc.

According to certain embodiments, device 10 is configured to perform an energy efficient method of cell selection or reselection. Therefore, one embodiment introduces the notion of energy efficient initial access, as well as network and device operation schemes based on assisted network discovery. In this embodiment, assisted network discovery means that the discovery information of the secondary RAT is broadcasted together with the system information of the primary RAT. In an embodiment, the discovery information is broadcast by an access point, which may be a dual mode access point such as a HNB/WLAN access point. Further, it is noted that the optimization of energy consumption in network and device operation schemes is also based on their usage patterns.

Figure 2:
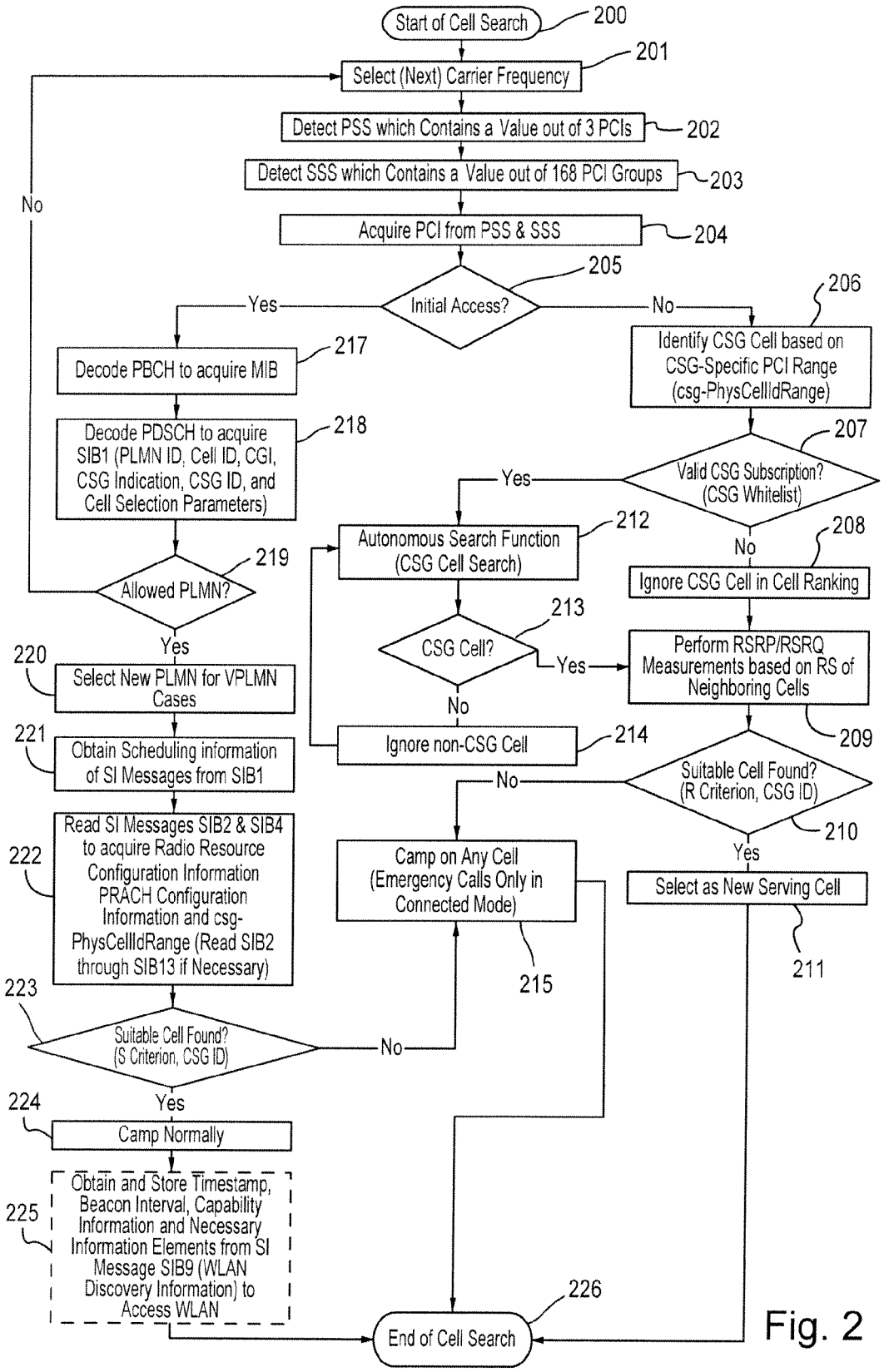
FIG. 2 illustrates a flowchart of a long term evolution (LTE) cell search method, according to an embodiment.

FIG. 2 illustrates a flowchart of assisted network discovery in a LTE system, according to one embodiment. In certain embodiments, the functionality of the flowchart of FIG. 2, and FIGS. 3, 6 to 8 discussed below, are implemented by software stored in memory 14 or other computer readable or tangible media, and executed by processor 22 of device 10. In other embodiments, the functionality may be performed by hardware (e.g., through the use of an application specific integrated circuit (ASIC), a programmable gate array (PGA), a field programmable gate array (FPGA), etc.), or any combination of hardware and software.

Referring to FIG. 2, at 200, the cell search procedure is started. The cell search procedure of LTE as shown in FIG. 2 can be invoked by a cell selection procedure that occurs when device 10 powers on or recovers from lack of coverage, and/or a cell reselection procedure to search for a better cell after device 10 has gained initial access. At 201, a (next) carrier frequency is selected for cell selection or reselection. As part of the cell search procedure, device 10 will need to perform initial synchronization to detect a LTE cell and decode all information required for registering to it. LTE employs a hierarchical cell search scheme whereby its synchronization sequences are divided into primary synchronization signal (PSS) and secondary synchronization signal (SSS). At 202, PSS is detected and, at 203, SSS is detected. The PCI is then derived, at 204, from PSS which contains three possible values to identify the PCI and SSS which contains 168 possible values to identify the PCI group.

At 205, device 10 determines whether it is an initial access case. For initial access cases, device 10 will proceed, at 217, to decode the physical broadcast channel (PBCH) and, at 218, to decode the physical downlink shared channel (PDSCH) to acquire the master information block (MIB), and system information block 1 (SIB 1) which contains key information. The key information may include public land mobile network (PLMN) identity (ID) and cell ID, from which the cell global identity (CGI) can be derived, CSG indication, and CSG ID. At 219, device 10 determines whether the PLMN is allowed. With the PLMN ID, the device will know if it belongs to that available PLMN based on the PLMN saved in the universal subscriber identity module (USIM). If device 10 does not belong to the available PLMN, the flow returns to 201. If, however, device 10 belongs to the available PLMN, at 220, device 10 selects the new PLMN for visited PLMN (VPLMN) cases. Then, at 221, device 10 obtains scheduling information of system information (SI) messages from SIB1.

At 222, device 10 reads SI messages SIB2 and SIB4 to acquire radio resource configuration information, PRACH configuration information, and csg-PhysCellIdRange. Device 10 may also read any other SI messages, ranging from SIB2 through SIB 13, if necessary. At 223, device 10 performs cell selection procedure to determine whether a suitable cell could be found. If no suitable cell could be found, then, at 215, device 10 camps on any cell. If a suitable cell has been found, then, at 224, device 10 camps normally on a target cell which satisfies the S criterion. If the target cell is a CSG cell, then device 10 may need to perform an additional CSG ID check to avoid camping on an unauthorized HNB. At 225, device 10 obtains and stores timestamp, beacon interval, capability information, and necessary information elements from SI message that corresponds to SIB9 (WLAN discovery information) to access WLAN. Then, at 226, the cell search ends.

In the case of non-initial access, device 10 may identify, at 206, whether a target cell is a CSG cell. Note that it is possible to differentiate between a CSG and non-CSG cell based on the stored CSG-specific PCI range (csg-PhysCellIdRange) in block 222, which is valid for 24 hours, without extracting specific CSG information by reading SIBs of the measure neighboring cells. At 207, device 10 determines whether it has a valid CSG subscription. If device 10 has a valid CSG subscription (non-empty CSG whitelist), then it can perform CSG cell search, at 212, by using the autonomous search function which may ignore a non-CSG cell, at 214. After performing the autonomous search function, at 213, it is determined whether the target cell is a CSG cell. On the other hand, if device 10 does not have a valid CSG subscription, then it may ignore, at 208, CSG cell in its cell ranking during the cell reselection procedure. These are ways for device 10 to prioritize the handling of CSG cell and save battery power during CSG cell search.

Further, for non-initial access cases, device 10 need not decode PBCH and PDSCH, but rather it performs, at 209, measurements such as reference signal received power (RSRP) and reference signal received quality (RSRQ) based on the reference signal (RS) of neighboring cells. At 210, device 10 performs cell reselection procedure to determine whether a suitable cell could be found. At 211, a suitable cell which maximizes the R criterion will then be reselected as the new serving cell. Similarly, if the target cell is a CSG cell, then device 10 may need to perform an additional CSG ID check to avoid reselecting an unauthorized HNB. In both initial access and non-initial access cases, device 10 will camp, at 215, on any cell where only emergency calls are allowed in the connected mode when no suitable and acceptable cell was found. The cell search procedure ends at 226.

Thus, embodiments of the invention include the broadcast WLAN discovery information which may include timestamp, beacon interval, capability information, and necessary information elements to assist device in accessing WLAN system without performing independent cell search in block 225. This implies that battery power of devices associated with scanning WLAN can be optimized. It is worth mentioning that the necessary information elements may include key information elements such as service set identity (SSID), supported rates, and physical layer (PHY) parameter set, and any other optional information elements. For example, the optional information elements may be present to support high throughput (HT) and very high throughput (VHT) functionalities by including the HT capabilities and HT operation, as well as VHT capabilities and VHT operation, respectively.

Figure 3:
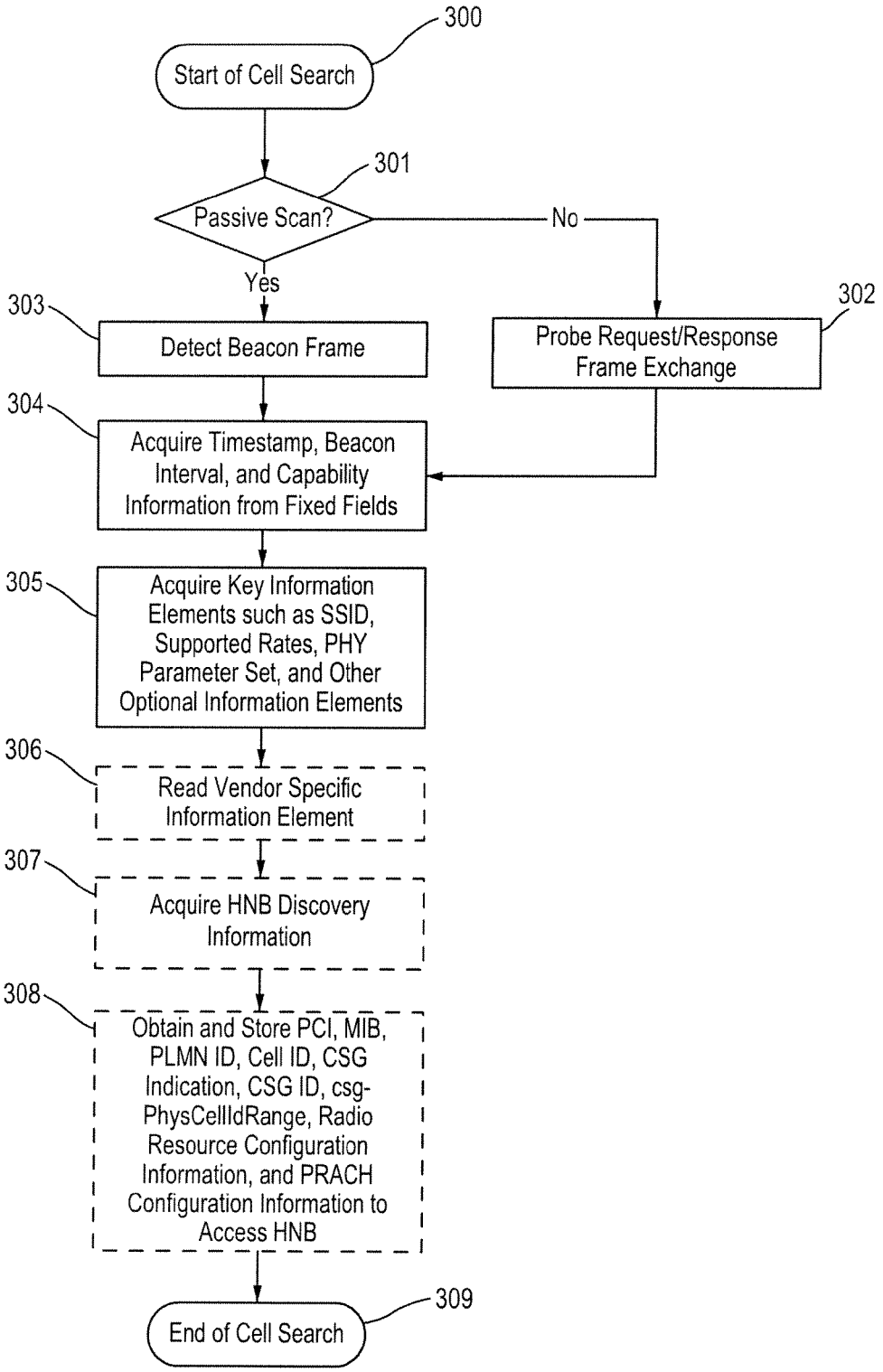
FIG. 3 illustrates a flowchart of a wireless local area network (WLAN) passive/active scanning method, according to an embodiment.

FIG. 3 illustrates a flowchart of assisted network discovery in a WLAN system, according to one embodiment. At 300, the cell search procedure of WLAN is started. At 301, device 10 decides whether to perform passive scanning or active scanning. The device 10 may, at 303, perform passive scanning on each channel for a beacon interval of typically 100 ms if it has no prior knowledge about any existing WLANs. Hence, the time and energy spent will increase linearly with the number of channels to be scanned. On the other hand, the device 10 may perform, at 302, active scanning through additional probe request/response frame exchanges if it knows the SSID of a specific WLAN that it is trying to access. Note that the device may also perform active scanning by using a wildcard SSID, i.e., non-specific SSID. However, such active scanning will not detect hidden WLAN.

After detecting the beacon frame at 303 when performing passive scanning or performing active scanning at 302, device 10 may acquire, at 304, fixed field information such as timestamp, beacon interval, and capability information. Device 10 may further acquire, at 305, key variable length information elements such as service set identifier (SSID), supported rates, PHY parameter set, and other optional information elements, if any.

Embodiments of the invention include the broadcast of HNB discovery information which may include PCI, MIB, PLMN ID and cell ID from which the CGI can be derived, CSG indication, CSG ID, csg-PhysCellIdRange, radio resource configuration information, and physical random access channel (PRACH) configuration information to assist device 10 in accessing LTE system without performing independent cell search which includes the measurement of neighboring cells in the case of cell reselection procedure. Similarly, this implies that battery power of devices associated with scanning LTE can be optimized.

Thus, referring to FIG. 3, at 306, device 10 reads the vendor specific information element and, at 307 acquires the HNB discovery information. At 308, device 10 obtains and stores PCI, MIB, PLMN ID, cell ID, CSG indication, CSG ID, csg-PhysCellIdRange, radio resource configuration information, and PRACH configuration information to access the HNB. The cell search then ends at 309.

Embodiments of the invention also provide examples of how discovery information of the secondary RAT can be broadcasted together with system information of the primary RAT. In some embodiments, the discovery information shown in FIG. 4, and FIG. 5 discussed below, may be broadcast by a dual-mode HNB/WLAN or a multi-mode access point.

Figure 4:
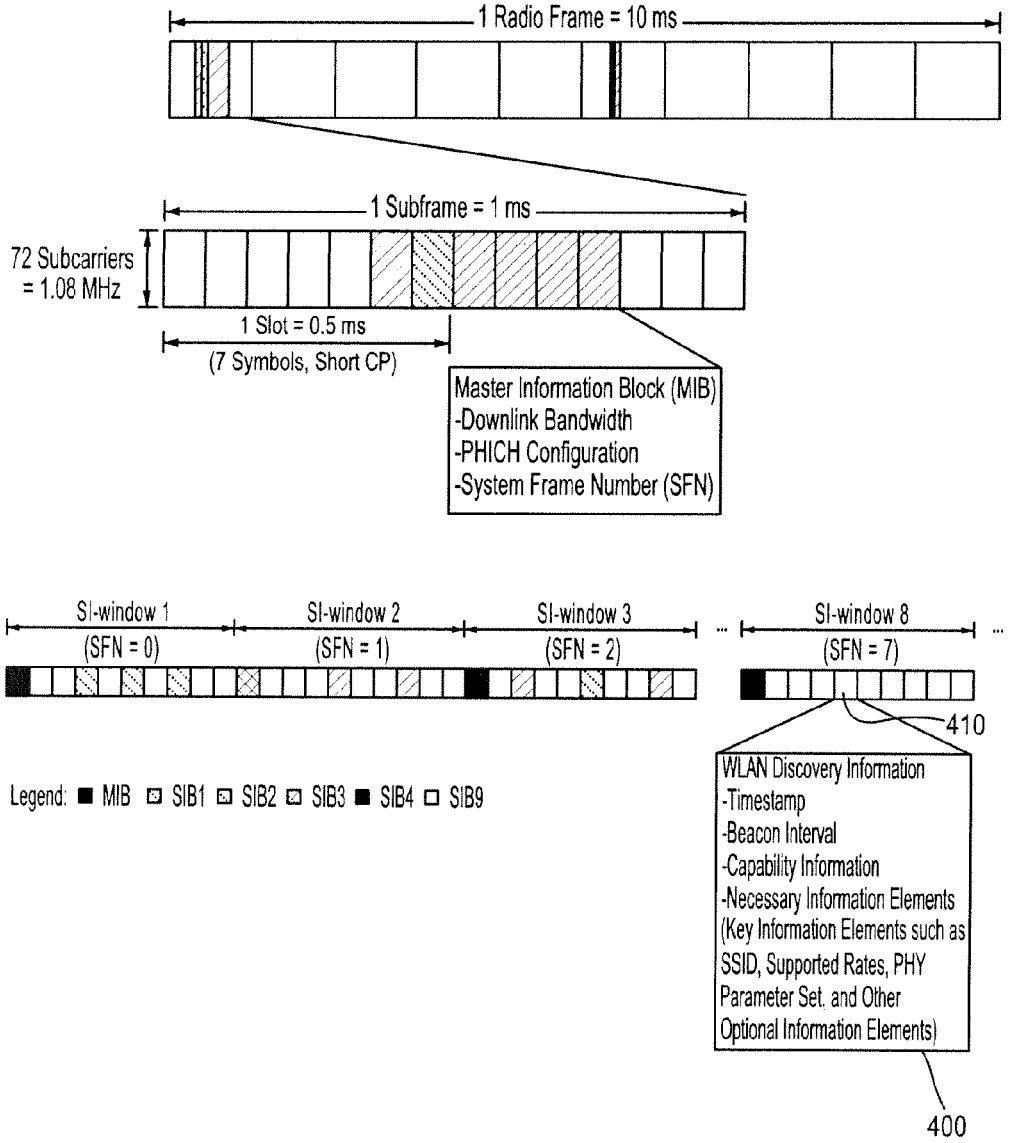
FIG. 4 illustrates an example of long term evolution (LTE) frequency division duplex (FDD) frame structure and system information scheduling, according to an embodiment.
Figure 5A:
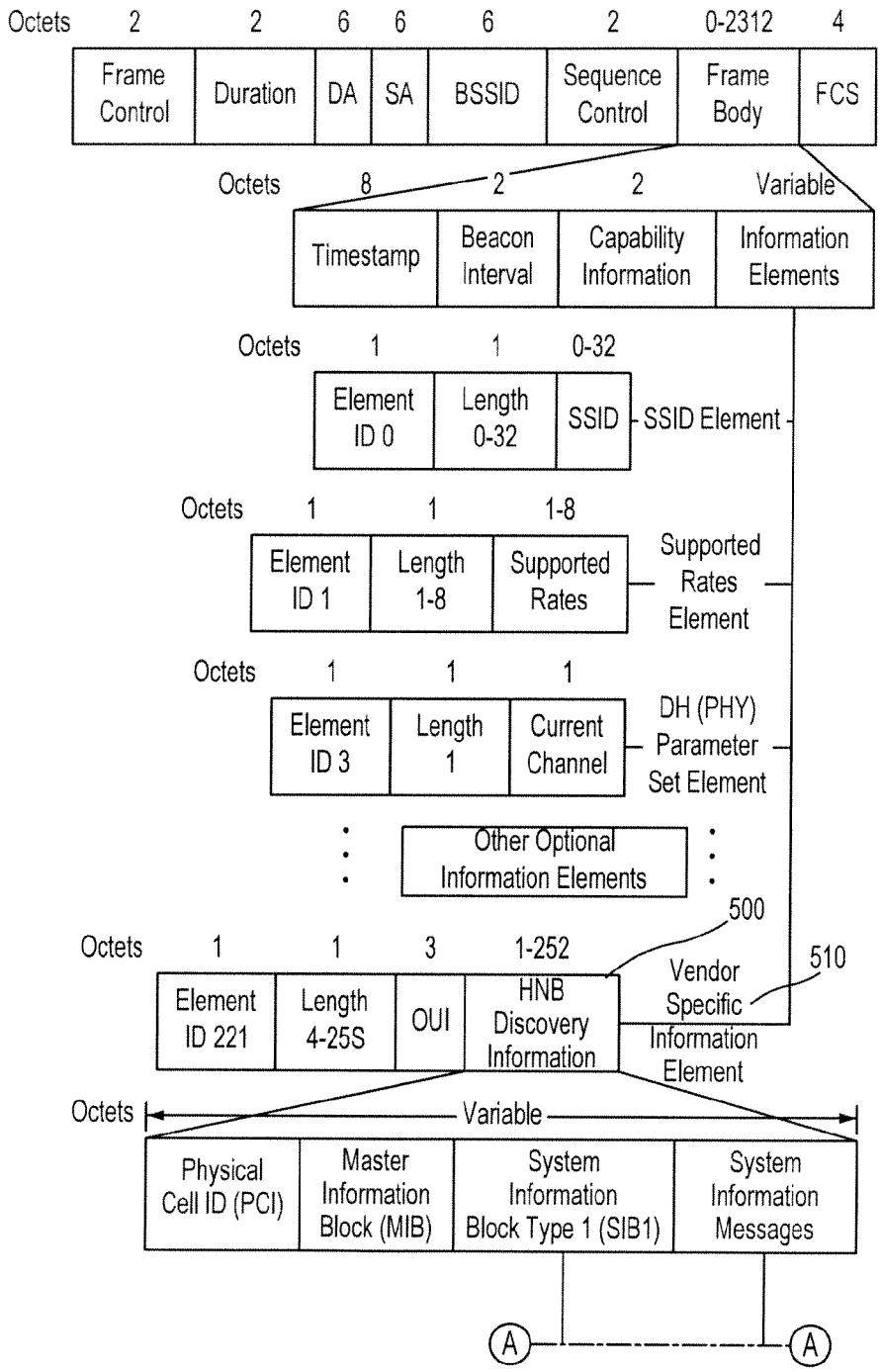
FIG. 5 illustrates an example of a wireless local area network (WLAN) beacon frame format, according to one embodiment.
Figure 5B:
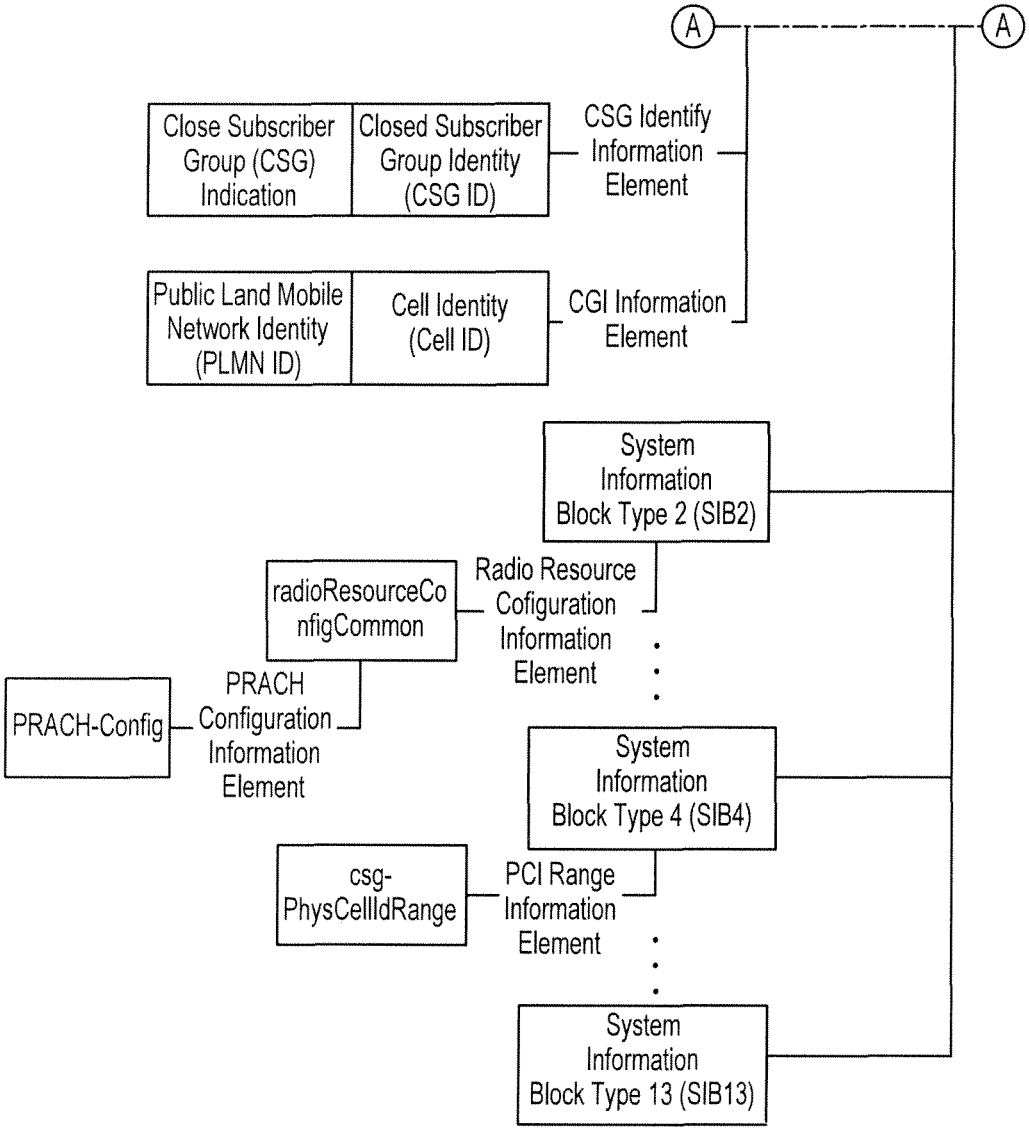

FIG. 4 illustrates an example of a LTE frequency division duplex (FDD) frame structure, master information block (MIB), system information block 1 (SIB 1), and scheduling of other system information messages in which WLAN discovery information is contained in system information block 9 (SIB9). For example, FIG. 4 illustrates WLAN discovery information 400 that is scheduled to be transmitted in the LTE SI message (SIB 9) 410. FIG. 5 illustrates HNB discovery information 500 that is transmitted in the vendor specific information element 510 of WLAN beacon.

The LTE system information in FIG. 4 may be transmitted based on time scheduling. The MIB and SIB 1 messages have fixed periodicities of 40 ms and 80 ms, respectively. Additionally, the MIB is repeated in subframe #0 (1 subframe=1 ms) of every radio frame (1 radio frame=10 ms), while SIB1 is repeated in subframe #5 of every other radio frame. The MIB contains the system frame number (SFN) which functions as a running counter of the radio frames. On the other hand, the scheduling of SI messages may be more flexible. Each SI message is transmitted in a specific scheduling window known as the SI-window with a predefined periodicity. The SI-windows of different SI messages are consecutive and have a common configurable length. Within each SI-window, the corresponding SI message can be transmitted multiple times over different subframes. However, no SI message can be transmitted in subframes that are used for SIB1 and uplink time division duplex (TDD) transmissions. According to one embodiment, the WLAN discovery information 400 may be stored in SIB 9 which currently contains the name of HNB for display on devices during manual CSG selection.

The WLAN information element in FIG. 5 is a flexible data structure that occurs in the frame body in order of increasing identifiers. It contains an information identifier, a length, and the content of the information element. The vendor specific information set 510 contains an additional mandatory field known as the organizationally unique identifier that distinguishes between vendors. In one embodiment, the HNB discovery information 500 may be stored in the variable vendor specific information field which can accommodate up to 252 octets of information.

Figure 6:
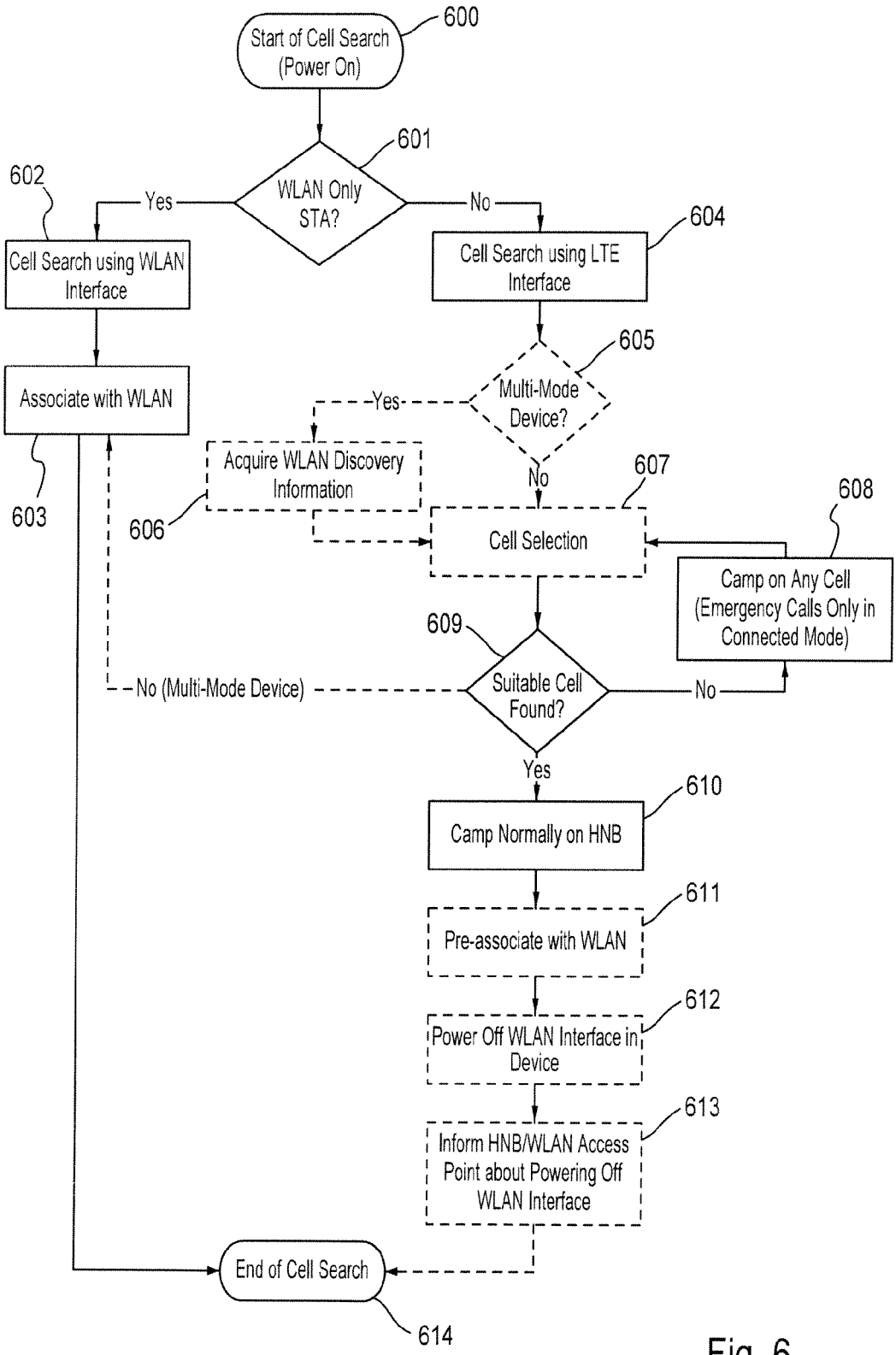
FIG. 6 illustrates a flowchart of an initial access or cell selection method, according to an embodiment.

One embodiment specifies that devices always perform the cell search procedure, upon powering on or upon recovery from lack of coverage, using the RAT of wide area coverage, such as LTE. FIG. 6 illustrates a flowchart of a cell selection procedure upon the powering on of devices in the vicinity of the dual mode HNB/WLAN access point, according to an embodiment. As depicted in FIG. 6, the cell search procedure starts upon power on at 600. At 601, it is determined whether the station is a WLAN only STA. If it is a WLAN only STA, then, at 602, cell search is performed using WLAN interface and, at 603, the device associates with WLAN.

According to an embodiment, if the device is not a WLAN only STA, then the device may perform cell search, at 604, by using LTE as the default interface so that idle mode mobility to macro cell, for example, will not be affected. At 605, it is determined whether the device supports multi-mode capability. If so, the device may acquire, at 606, the discovery information of the secondary RAT, such as WLAN. After cell selection at 607 and confirming that a suitable cell was found at 609, the device may camp normally on HNB at 610. Multi-mode device may pre-associate with WLAN, at 611. After which, the multi-mode device can power off the WLAN interface at 612 to save energy, and inform the HNB/WLAN access point accordingly at 613. If no suitable and acceptable cell was found at 609, then the device may camp on any cell at 608. However, for multi-mode device, it may also associate with WLAN at 603 by using the discovery information acquired at 606. The cell search procedure ends at 614. It should be noted that the energy savings here is twofold. First, devices only need to perform an LTE cell search procedure to acquire system information of both HNB and WLAN. Second, devices can power off their WLAN interface after pre-association.

Figure 7A:
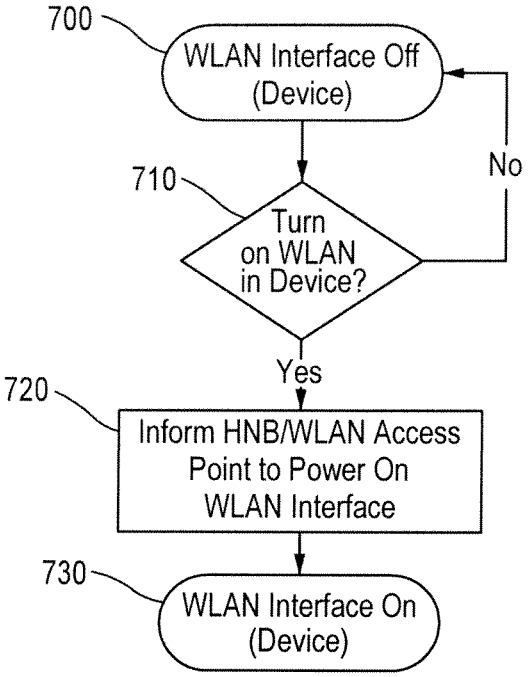
FIG. 7a illustrates a flowchart of a method of powering on a radio access technology (RAT) interface, according to an embodiment.

FIG. 7a illustrates a method for devices to selectively power on the secondary RAT interface, such as WLAN, only when required and when its corresponding RAT exists in the device's coverage region, according to one embodiment. Specifically, as illustrated in FIG. 7a, the WLAN interface is off at 700 and, at 710, it is determined whether the WLAN interface in the device should be powered on. When it is determined that the WLAN interface should be powered on, the HNB/WLAN access point is informed to power on WLAN interface. The WLAN interface could be powered on for the purpose of best effort services, interference mitigation, capacity enhancements, and 'ping-pong' handover mitigation, amongst others on the condition that a WLAN access point exists in the vicinity. The availability of secondary RAT can be implied by the existence of its discovery information while listening to the primary RAT. The WLAN interface in the device in on at 730.

Figure 7B:
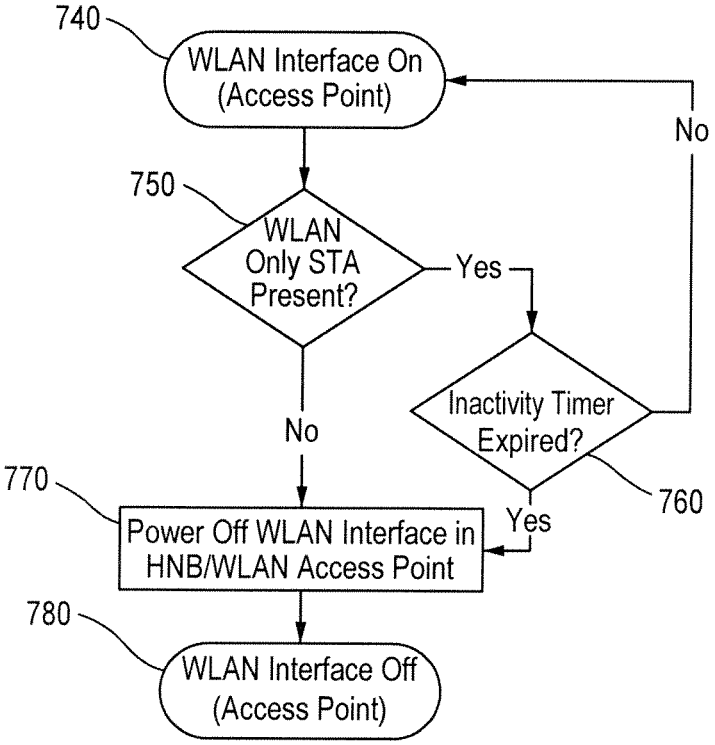
FIG. 7b illustrates a flowchart of a method of powering off a radio access technology (RAT) interface, according to an embodiment.

FIG. 7b illustrates a method for the dual mode HNB/WLAN access point to power off the secondary RAT, such as WLAN interface, to save energy when there is either no WLAN only device in its coverage region or the inactivity timer of all WLAN only devices have expired, according to an embodiment. As illustrated in FIG. 7b, the WLAN interface is on at 740. At 750, it is determined whether a WLAN only STA is present. If a WLAN only STA is present, then it is determined, at 760, whether the inactivity timer has expired. If the inactivity timer has not expired, then the flow returns to 740. If no WLAN only STA is present or if the inactivity timer has expired, then, at 770, the WLAN interface in the HNB/WLAN access point is powered off. FIG. 7b does not serve to limit the decision mechanisms for powering off WLAN interface. For example, the WLAN interface may be powered off during specific times of the day such as at night. On the other hand, it may not be powered off when it is required to assist in HNB discovery as discussed below. The powering off of WLAN interface in the dual mode HNB/WLAN access point is possible now as the primary RAT, such as LTE, will assist in announcing its existence.

Figure 8:
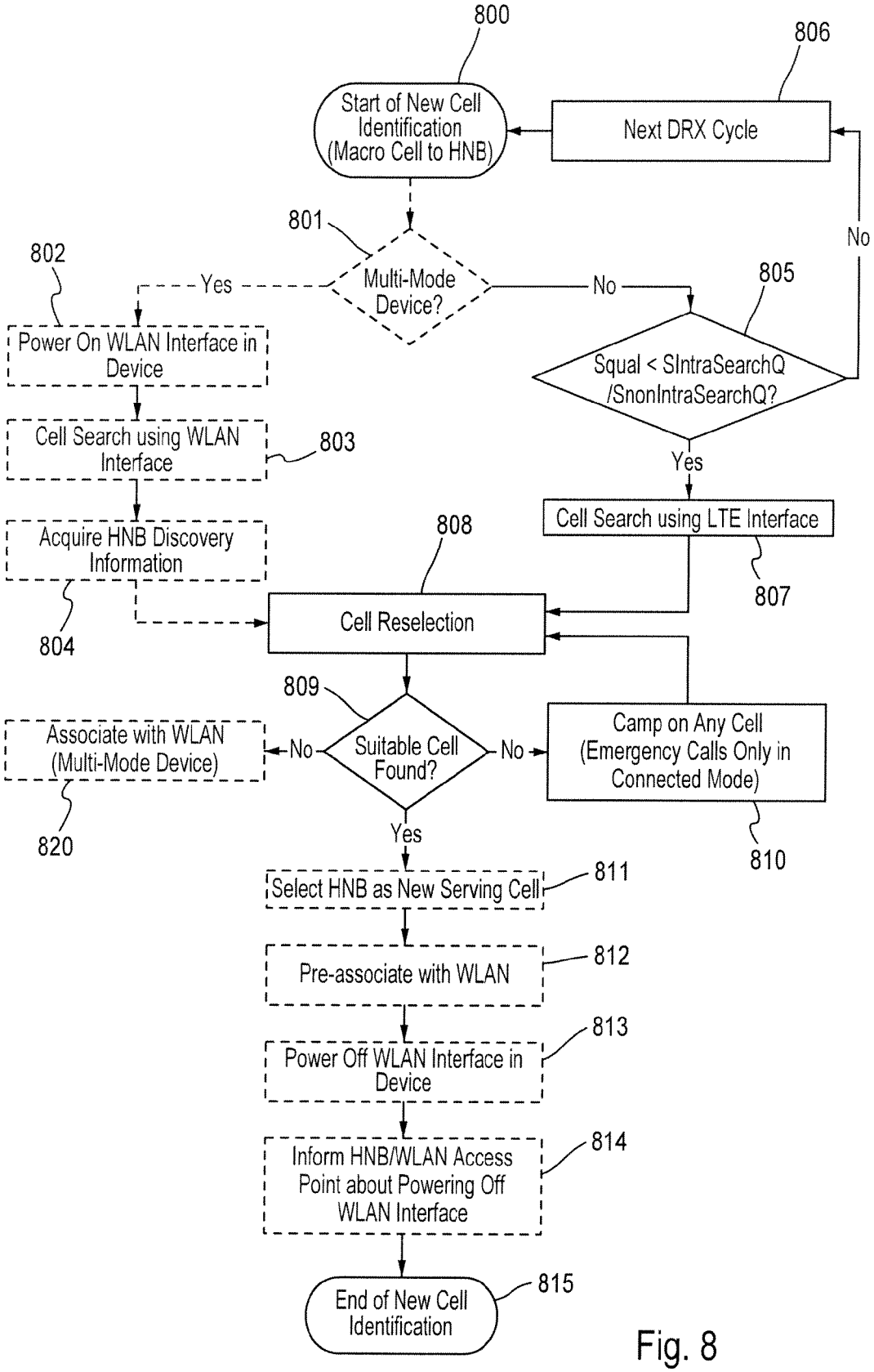
FIG. 8 illustrates a flowchart of an enhanced cell reselection method after initial access, according to an embodiment.

Another embodiment is directed to the concept of utilizing the second RAT, such as WLAN, to assist in the discovery of HNB. This will ensure guaranteed successful HNB discovery in order to facilitate data offloading. FIG. 8 illustrates a flowchart of the enhanced cell reselection procedure in the vicinity of the HNB/WLAN access point, according to one embodiment.

According to this embodiment, the device can perform cell reselection from macro cell to HNB by using WLAN as the default interface. Note that devices would know that HNB is in their vicinity as CSG cell will broadcast, in SIB1, the CSG indication flag and CSG ID, which are valid for up to 3 hours. Moreover, the range of PCI values that are used for CSG cell is broadcasted as the csg-PhysCellIdRange parameter, which is valid for up to 24 hours, in SIB4. The macro cell can also be optionally configured to broadcast the csg-PhysCellIdRange parameter. These are various means available in 3GPP Release 10 to assist devices in CSG cell search as specified in 3GPP TS 36.331 and TS 36.304.

As illustrated in FIG. 8, the new cell identification begins at 800. At 801, it is determined whether the device supports multi-mode capability. If it is not a multi-mode device, then, at 805, it is determined whether Squal<SIntraSearchQ/SnonIntraSearchQ. If so, cell search is performed using LTE interface at 807, and the flow proceeds to trigger cell reselection at 808 discussed below. If the determination at 805 is negative, then the flow proceeds to the next DRX cycle at 806.

If the device supports multi-mode capability, it could then power on its WLAN interface at 802. At 803, the device may perform cell search using the WLAN interface, and acquire, at 804, HNB discovery information when it is in the proximity of CSG cells. For security concerns, the device may use the knowledge of a secure WLAN SSID to verify the authenticity of the HNB discovery information. Moreover, the LTE and WLAN interfaces are collocated in the same access point which means that discovery information of the second RAT would be reliable.

At 808, the device performs cell reselection and, at 809, determines if a suitable cell was found. If no suitable and acceptable cell was found, then the device, at 810, may camp on any cell. However, for multi-mode device, it may also associate with WLAN at 820 by using the WLAN system information acquired at 803. If The HNB is selected as the new serving cell at 811 if it was found to be a suitable cell. Similarly, for multi-mode device, it may pre-associate with WLAN, at 812. After which, to save energy, the multi-mode device can power off its WLAN interface, at 813, and inform, at 814, the HNB/WLAN access point accordingly. The new cell identification ends at 815.

Such assisted HNB discovery would not generate extra interferences to the LTE system, for example, by reselecting to a cell which is not the best ranked cell, since HNB would likely be the highest ranked cell of its frequency in a home scenario where end-users are residing. In addition, according to certain embodiments, no measurement of neighboring cells is required in the cell reselection procedure which leads to significant improvement in energy efficiency.

As a result of the embodiments discussed herein, there will be a significant reduction in latency and energy consumption associated with cell selection/reselection when discovery information of secondary RATs can be acquired by listening to a primary RAT. This implies that devices need not scan the entire frequency band of each RAT in order to look for critical system information such as PLMN ID, CGI, CSG ID, SSID, etc. The initial access via cellular networks, such as LTE, maintains its advantage of idle mode mobility of macro cell to HNB, HNB to macro cell, and between HNBs. Devices can save energy by powering on only the relevant RAT interface according to its geolocation, applications, and requirements. Access points can also save energy by powering off interfaces at instances where it may not be required.

Embodiments of the invention also guarantee successful HNB discovery for effective data offloading which would otherwise result in QoS and energy efficiency degradation. Further, the need for heavy measurement of neighboring cells during cell reselection from macro cell to HNB is eliminated, which leads to substantial energy savings. Embodiments of the invention will greatly benefit multi-mode devices, supported by either software defined radio (SDR) reconfigurability or multiple transceivers, in terms of improved latency and energy efficiency. In addition, embodiments of the invention support backward compatibility for single-mode devices.

The described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Therefore, one having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:

gathering, by a multi-mode device, discovery information of a secondary radio access technology (RAT) by listening to a single primary RAT in idle mode, wherein the discovery information of the secondary RAT is gathered together with system information of the primary RAT, and wherein the gathering comprises gathering the discovery information from a dual mode home NodeB (HNB)/wireless local area network (WLAN) access point;

performing cell selection and/or reselection using the discovery information without performing an independent cell search;

pre-associating with the secondary RAT by using the discovery information gathered from the primary RAT; and powering off an interface used to communicate with the secondary RAT after pre-association, wherein the [multi-mode device] *dual mode home NodeB (HNB)/ wireless local area network (WLAN) access point* is informed when the interface used to communicate with the secondary RAT should be turned on, and wherein the system information of the primary RAT comprises a physical cell identity (PCI).

2. The method according to claim 1, further comprising informing the dual mode access point that the interface has been powered off.

3. The method according to claim 1, wherein the discovery information comprises one of wireless local area network (WLAN) discovery information and home nodeB (HNB) discovery information.

4. The method according to claim 3, wherein the wireless local area network (WLAN) discovery information comprises at least one of timestamp, beacon interval, capability information, and key information elements including service set identity (SSID), supported rates, physical layer (PHY) parameter set, and any other optional information elements.

5. The method according to claim 3, wherein the home nodeB (HNB) discovery information further comprises at least one master information block (MIB), key system information including public land mobile network (PLMN) identity (ID), cell ID, closed subscriber group (CSG) indication, and CSG ID found in system information block 1 (SIB 1), radio resource configuration information and physical random access channel (PRACH) configuration information found in system information block 2 (SIB2), and CSG-specific PCI range information found in system information block 4 (SIB4).

6. An apparatus, comprising:

at least one processor; and at least one memory including computer program code;

the at least one memory and the computer program code are configured, with the at least one processor, to cause the apparatus at least to gather discovery information of a secondary radio access technology (RAT) by listening to a single primary RAT in idle mode, wherein the discovery information of the secondary RAT is gathered together with system information of the primary RAT, and wherein the discovery information is gathered from a dual mode home NodeB (HNB)/ wireless local area network (WLAN) access point;

perform cell selection and/or reselection using the discovery information without performing an independent cell search;

pre-associate with the secondary RAT by using the discovery information gathered from the primary RAT; and power off an interface used to communicate with the secondary RAT after pre-association, wherein the [multi-mode device] *dual mode home NodeB (HNB)/ wireless local area network (WLAN) access point* is informed when the interface used to communicate with the secondary RAT should be turned on, and wherein the system information of the primary RAT comprises a physical cell identity (PCI).

7. The apparatus according to claim 6, wherein the at least one memory and the computer program code are further configured, with the at least one processor, to cause the apparatus at least to inform the dual mode access point that the interface has been powered off.

8. The apparatus according to claim 6, wherein the discovery information comprises one of wireless local area network (WLAN) discovery information and home nodeB (HNB) discovery information.

9. The apparatus according to claim 8, wherein the wireless local area network (WLAN) discovery information comprises at least one of timestamp, beacon interval, capability information, and key information elements including service set identity (SSID), supported rates, physical layer (PHY) parameter set, and any other optional information elements.

10. The apparatus according to claim 8, wherein the home nodeB (HNB) discovery information further comprises at least one of master information block (MIB), key system information including public land mobile network (PLMN) identity (ID), cell ID, closed subscriber group (CSG) indication, and CSG ID found in system information block 1 (SIB 1), radio resource configuration information and physical random access channel (PRACH) configuration information found in system information block 2 (SIB2), and CSG-specific PCI range information found in system information block 4 (SIB4).

11. A computer program embodied on a non-transitory computer readable storage medium, the computer program configured to control a processor to perform a process, comprising:

gathering discovery information of a secondary radio access technology (RAT) by listening to a single primary RAT in idle mode, wherein the discovery information of the secondary RAT is gathered together with system information of the primary RAT, and wherein the gathering comprises gathering the discovery information from a dual mode home NodeB (HNB)/wireless local area network (WLAN) access point;

performing cell selection and/or reselection using the discovery information without performing an independent cell search;

pre-associating with the secondary RAT by using the discovery information gathered from the primary RAT; and powering off an interface used to communicate with the secondary RAT after pre-association, wherein the [multi-mode device] *dual mode home NodeB (HNB)/ wireless local area network (WLAN) access point* is informed when the interface used to communicate with the secondary RAT should be turned on, and wherein the system information of the primary RAT comprises a physical cell identity (PCI).

* * * * *